United States Patent
Schuler et al.

(10) Patent No.: US 11,744,173 B2
(45) Date of Patent: *Sep. 5, 2023

(54) CROP CUTTING KNIVES FOR AGRICULTURAL COMBINE HARVESTER

(71) Applicant: Deere & Company, Moline, IL (US)

(72) Inventors: Mark Schuler, Geneseo, IL (US); Shreyas Modak, Pune (IN)

(73) Assignee: Deere & Company, Moline, IL (US)

( * ) Notice: Subject to any disclaimer, the term of this patent is extended or adjusted under 35 U.S.C. 154(b) by 204 days.

This patent is subject to a terminal disclaimer.

(21) Appl. No.: 17/014,468

(22) Filed: Sep. 8, 2020

(65) Prior Publication Data

US 2021/0161069 A1 Jun. 3, 2021

Related U.S. Application Data

(63) Continuation of application No. 15/997,149, filed on Jun. 4, 2018, now Pat. No. 10,765,060.

(51) Int. Cl.
*A01D 34/14* (2006.01)
*A01D 34/04* (2006.01)

(52) U.S. Cl.
CPC ............. *A01D 34/14* (2013.01); *A01D 34/04* (2013.01)

(58) Field of Classification Search
CPC ........ A01D 34/14; A01D 34/04; A01D 41/02; A01D 41/12
See application file for complete search history.

(56) References Cited

U.S. PATENT DOCUMENTS

| 513,834 | A | 1/1894 | Smith |
| 1,435,514 | A | 11/1922 | Burns |
| 2,227,864 | A | 1/1941 | Ronan |
| 2,529,087 | A | 11/1950 | Leake |
| 2,568,870 | A | 9/1951 | Ronan |
| 3,828,631 | A | 8/1974 | Spengler et al. |
| 3,855,892 | A | 12/1974 | DiLello et al. |

(Continued)

FOREIGN PATENT DOCUMENTS

| CA | 2296258 A1 | 9/2000 |
| CA | 2836427 A1 | 8/2014 |

(Continued)

OTHER PUBLICATIONS

European Search Report issued in counterpad European Patent Application No. 19177902.4 dated Oct. 31, 2019 (5 pages).

(Continued)

Primary Examiner — Arpad F Kovacs
(74) Attorney, Agent, or Firm — Michael Best & Friedrich LLP (57) ABSTRACT

A cutting knife includes a base coupled to a head unit of an agricultural combine harvester. The cutting knife includes a blade extending away from the base. The blade includes an edge and a plurality of cutting teeth formed from the edge. The plurality of cutting teeth includes a first grouping of teeth positioned along the edge having a first pitch. The plurality of cutting teeth includes a second grouping of teeth positioned along the edge having a second pitch less than the first pitch. The first grouping of teeth is positioned closer to an end of the blade opposite the base than the second grouping of teeth.

20 Claims, 4 Drawing Sheets

(56) References Cited

U.S. PATENT DOCUMENTS

| | | | |
|---|---|---|---|
| 4,179,967 | A | 12/1979 | Clark |
| 4,223,514 | A | 9/1980 | Halls et al. |
| 4,290,326 | A | 9/1981 | Ibach et al. |
| 4,782,731 | A * | 11/1988 | Huntington ............ A01D 34/73 |
| | | | 83/837 |
| 5,177,943 | A | 1/1993 | Lawson |
| 5,209,054 | A * | 5/1993 | Lawson ................ A01D 34/13 |
| | | | 30/337 |
| 5,918,525 | A * | 7/1999 | Schramm ............ B23D 61/128 |
| | | | 83/837 |
| 6,003,422 | A | 12/1999 | Holston |
| 6,065,380 | A | 5/2000 | Lundh |
| 6,305,154 | B1 | 10/2001 | Yang et al. |
| 6,467,246 | B1 | 10/2002 | McCredie |
| 6,510,681 | B2 | 1/2003 | Yang et al. |
| 6,857,255 | B1 | 2/2005 | Wilkey et al. |
| 7,124,567 | B1 | 10/2006 | Adamson et al. |
| 7,313,903 | B2 | 1/2008 | Schumacher et al. |
| 7,328,565 | B2 | 2/2008 | Snider et al. |
| 7,503,162 | B2 | 3/2009 | Herlyn et al. |
| D729,599 | S | 5/2015 | Talbot |
| 10,368,484 | B2 | 8/2019 | Talbot |
| 10,462,962 | B2 | 11/2019 | Talbot |
| 10,575,463 | B2 | 3/2020 | Talbot |
| 10,648,051 | B2 * | 5/2020 | Stoffel .................. C21D 9/18 |
| D888,517 | S * | 6/2020 | Talbot ............................. D8/20 |
| 2002/0035827 | A1 | 3/2002 | Yang et al. |
| 2005/0166566 | A1 | 8/2005 | Majkrzak |
| 2007/0251372 | A1 | 11/2007 | Petts et al. |
| 2008/0000210 | A1 | 1/2008 | Jolly |
| 2008/0121079 | A1 | 5/2008 | Hashimoto et al. |
| 2008/0173001 | A1 | 7/2008 | Herlyn et al. |
| 2009/0013847 | A1 | 1/2009 | Lauzet |
| 2009/0293698 | A1 | 12/2009 | Tran et al. |
| 2010/0050587 | A1 | 3/2010 | Stoffel |
| 2011/0265627 | A1 | 11/2011 | Kwanka |
| 2013/0186053 | A1 | 7/2013 | Talbot |
| 2013/0192188 | A1 | 8/2013 | Talbot |
| 2013/0305682 | A1 * | 11/2013 | Talbot ................... A01D 43/00 |
| | | | 56/307 |
| 2014/0069249 | A1 | 3/2014 | Collins et al. |
| 2014/0182259 | A1 | 7/2014 | Talbot et al. |
| 2015/0163997 | A1 | 6/2015 | Talbot et al. |
| 2016/0007527 | A1 * | 1/2016 | Collins .................. B24B 3/586 |
| | | | 29/891 |
| 2016/0303671 | A1 | 10/2016 | Hunter et al. |
| 2016/0309648 | A1 | 10/2016 | Stoffel et al. |
| 2019/0053424 | A1 | 2/2019 | Talbot |
| 2019/0053425 | A1 | 2/2019 | Talbot |
| 2019/0053426 | A1 | 2/2019 | Talbot |
| 2019/0240753 | A1 | 8/2019 | Jukes et al. |
| 2020/0214197 | A1 * | 7/2020 | Schaffer ................ A01D 34/14 |
| 2020/0329635 | A1 * | 10/2020 | Smith .................... A01D 34/14 |

FOREIGN PATENT DOCUMENTS

| | | | | |
|---|---|---|---|---|
| CN | 102265739 | A | 12/2011 | |
| CN | 202998859 | U | 6/2013 | |
| CN | 206274773 | U | 6/2017 | |
| CN | 108029348 | A | 5/2018 | |
| DE | 102019124197 | A1 * | 3/2021 | ............ A01D 34/13 |
| DE | 102019125501 | A1 * | 3/2021 | ............ A01D 34/13 |
| EA | 201491380 | A1 | 12/2014 | |
| EP | 1728415 | B1 | 5/2008 | |
| EP | 1946630 | A1 | 7/2008 | |
| WO | WO-2021083875 | A1 * | 5/2021 | ............ A01D 34/14 |

OTHER PUBLICATIONS

Chinese Office Action issued in Chinese Patent Application No. 201910479545.8, dated May 31, 2022, in 07 pages.
Brazilian Office Action issued in U.S. Appl. No. 17/014,468, dated Jan. 18, 2023, in 05 pages, which is a foreign counterpart to the present patent application having U.S. Appl. No. 17/014,468.
SOG, "Folding Knife Mini X-Ray Vision," <https:tpf-online.com/tag/blade/> publically available on Dec. 22, 2017.

* cited by examiner

CROP CUTTING KNIVES FOR AGRICULTURAL COMBINE HARVESTER

BACKGROUND

The present disclosure relates to an agricultural combine harvester, and particularly to crop cutting knives on a head unit of an agricultural combine harvester.

SUMMARY

In one aspect, a cutting knife configured to be coupled to an agricultural combine harvester to cut crop plants from an agricultural field. The cutting knife includes a base configured to be coupled to a head unit of the agricultural combine harvester. The cutting knife also includes a blade having a blade central axis extending away from the base. The blade includes a plurality of cutting teeth. Each tooth of the plurality of teeth has a tip. The blade includes an edge tangent to each tip on a first side of the blade. The edge is obliquely oriented relative to the blade central axis. The plurality of teeth includes consecutive first, second, and third teeth positioned along the edge with a first distance separating the tips of the first and second teeth. The first distance is measured parallel to the edge. The first distance also separates the tips of the second and third teeth. The plurality of cutting teeth also includes consecutive fourth, fifth, and sixth teeth positioned along the edge with a second distance different than the first distance separating the tips of the fourth and fifth teeth. The second distance measured parallel to the edge. The second distance also separates the tips of the fifth and sixth teeth.

In another aspect, a cutting knife is configured to be coupled to an agricultural combine harvester to cut crop plants from an agricultural field. The cutting knife includes a base configured to be coupled to a head unit of the agricultural combine harvester. The cutting knife also includes a blade having a blade central axis extending away from the base. The blade includes a plurality of cutting teeth. Each tooth of the plurality of teeth has a tip. The blade includes an edge tangent to each tip on a first side of the blade. The edge is obliquely oriented relative to the blade central axis. The plurality of cutting teeth includes consecutive first, second, third, and fourth teeth positioned along the edge with a first distance separating the tips of the first and second teeth, a second distance different than the first distance separating the tips of the second and third teeth, and a third distance substantially the same as the first distance separating the tips of the third and fourth teeth. The first, second, and third distances are measured parallel to the edge.

In yet another aspect, a cutting knife is configured to be coupled to an agricultural combine harvester to cut crop plants from an agricultural field. The cutting knife includes a base configured to be coupled to a head unit of the agricultural combine harvester. The cutting knife also includes a blade extending away from the base. The blade includes an edge and a plurality of cutting teeth formed from the edge. The plurality of cutting teeth includes a first grouping of teeth positioned along the edge having a first pitch. The plurality of cutting teeth also includes a second grouping of teeth positioned along the edge having a second pitch less than the first pitch. The first grouping of teeth is positioned closer to an end of the blade opposite the base than the second grouping of teeth.

In yet another aspect, a crop cutting assembly for a head unit of an agricultural combine harvester. The crop cutting assembly is configured to cut crop plants from an agricultural field. The crop cutting assembly includes a drive linkage configured to reciprocate along an axis and a cutting knife. The cutting knife includes a base configured to be selectively coupled to the drive linkage and a blade extending away from the base. The blade includes an edge and a plurality of cutting teeth formed from the edge. The plurality of cutting teeth includes a first grouping of teeth positioned along the edge having a first pitch. The plurality of cutting teeth also includes a second grouping of teeth positioned along the edge having a second pitch less than the first pitch. The first grouping of teeth is positioned closer to an end of the blade opposite the base than the second grouping of teeth.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways. Terms of degree, such as "substantially," "about," "approximately," etc. are understood by those of ordinary skill to refer to reasonable ranges outside of the given value, for example, general tolerances associated with manufacturing, assembly, and use of the described embodiments.

Figure 1:
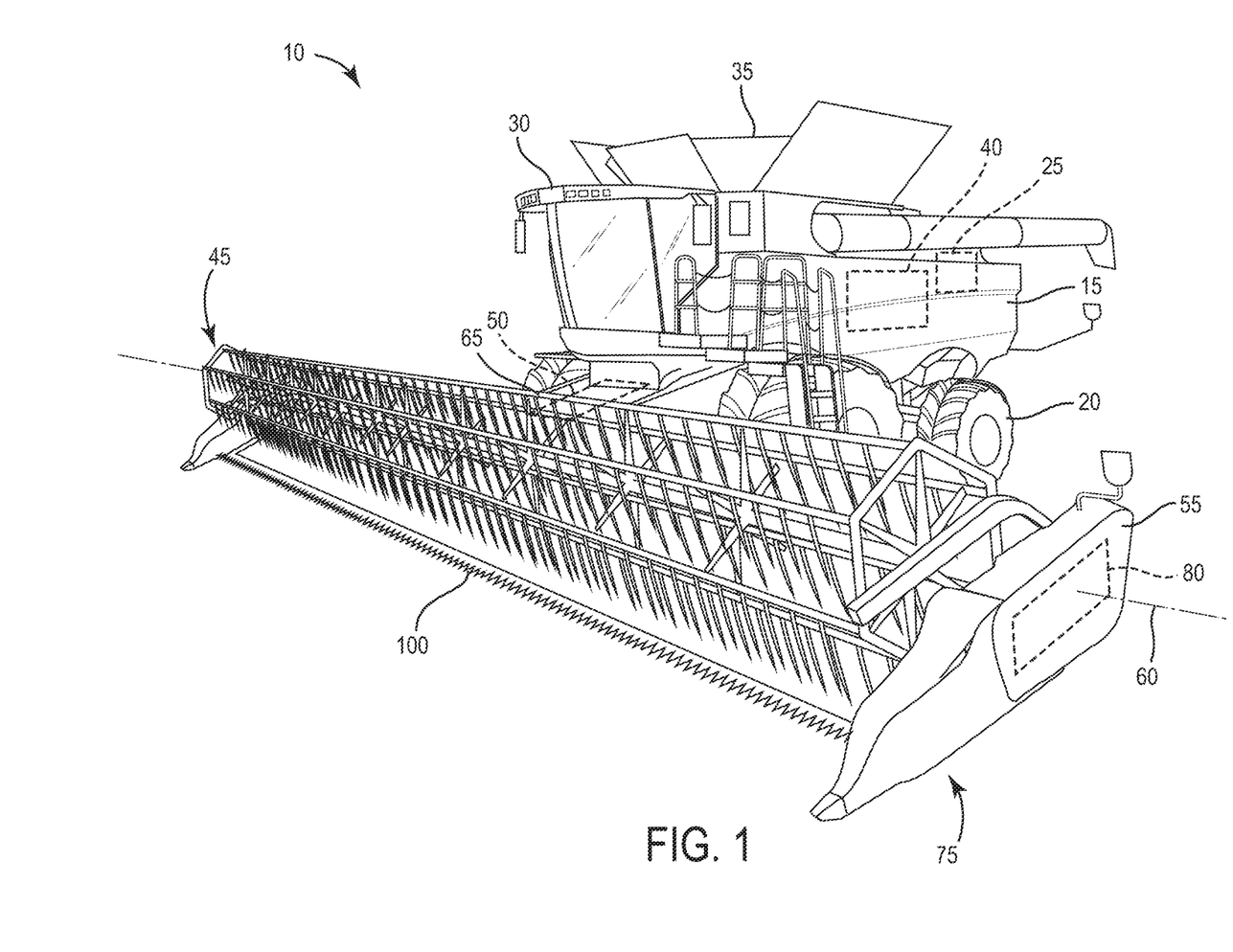
FIG. 1 is a perspective view of an agricultural combine harvester.

FIG. 1 illustrates an agricultural combine harvester 10 that is moveable across an agricultural field to harvest crop plants (e.g., beans, wheat, a combination of corn and wheat, etc.) therefrom. The harvester 10 includes a chassis 15, wheels 20 coupled to the chassis 15, a prime mover 25 (e.g., an internal combustion engine) supported by the chassis 15, and a cab 30 also supported by the chassis 15. The wheels 20 are driven by the prime mover 25 to move the harvester 10 across the field. The prime mover 25 also provides mechanical, hydraulic, and electrical power to other components and features of the harvester 10. The cab 30 is configured to support an operator of the harvester 10.

With continued reference to FIG. 1, the harvester 10 also includes a grain tank 35, a threshing unit 40, and a head unit 45. The head unit 45 is operable by the prime mover 25 to cut the crop plants from the agricultural field and convey the crop plants to the threshing unit 40 by a conveyor 50, which is located between the head unit 45 and the threshing unit 40.

The threshing unit 40 is then operable to separate the crop plants into a crop portion, which is collected within the grain tank 35, and a residue portion, which is discharged from the harvester 10 onto the agricultural field.

The illustrated head unit 45 is a draper head unit that includes a frame 55 having a longitudinal axis 60 oriented substantially transverse to a direction of travel of the harvester 10. The frame 55 supports a reel 65 rotatably extending between opposing sides of the frame 55 and a crop cutting assembly 75 including a drive unit 80 (FIG. 2) located on a side of the frame 55. In other embodiments, the head unit 45 can be differently configured dependent upon a particular crop plant being harvested.

Figure 2:
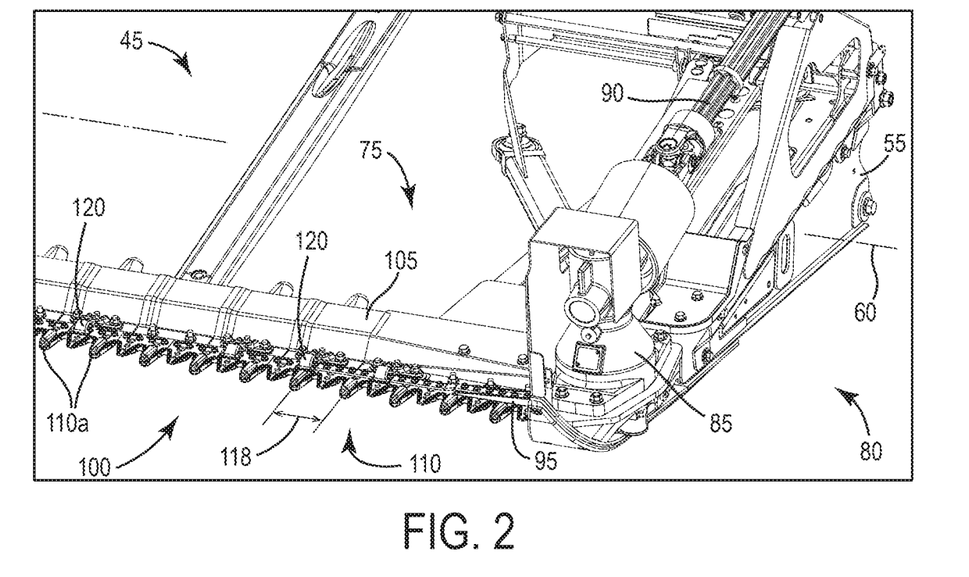
FIG. 2 is a perspective view of a portion of a head unit of the agricultural combine harvester of FIG. 1.

With reference to FIG. 2, the drive unit 80 includes a reciprocating mechanism 85 coupled to a drive shaft 90, which is in operational communication with the prime mover 25, and a drive linkage 95 (e.g., a drive plate) coupled to a plurality of cutting knives 100 of the crop cutting assembly 75. In the illustrated embodiment, the reciprocating mechanism 85 is a slider-crank mechanism that receives rotational movement from the drive shaft 90 and converts the rotational movement to a substantially linear reciprocating motion of the drive linkage 95 along an axis substantially parallel to the longitudinal axis 60 of the head unit 45. In other embodiments, the reciprocating mechanism 85 can be differently configured to linearly reciprocate the drive linkage 95.

Figure 3:
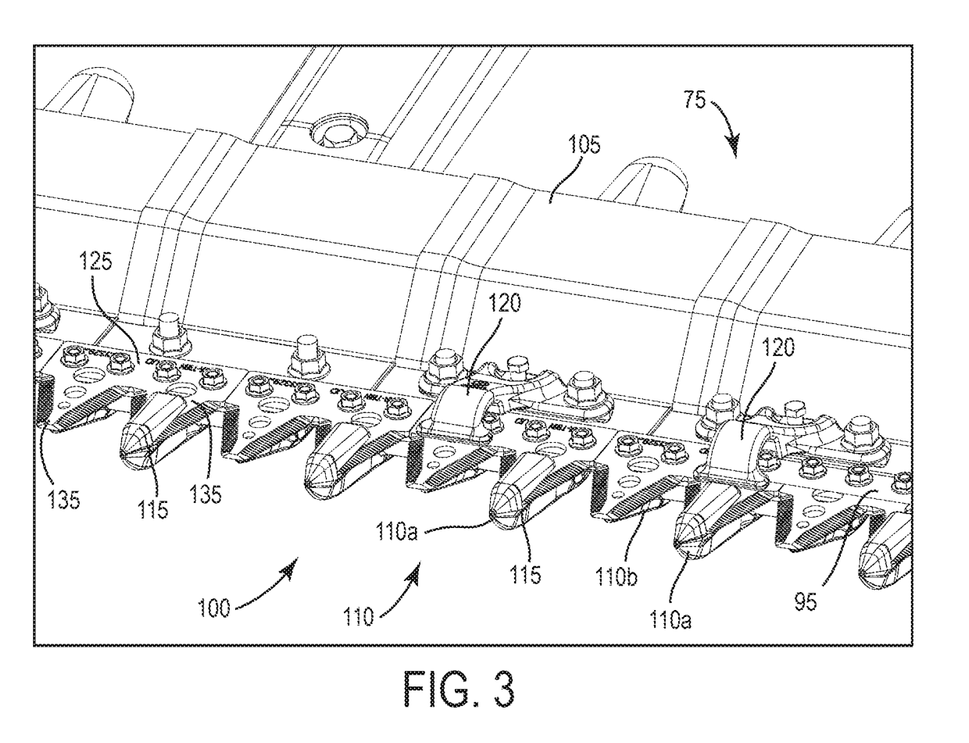
FIG. 3 is a detailed view of a portion of the head unit of FIG. 2 including a plurality of cutting knives.

As best shown in FIGS. 2 and 3, the cutting knives 100 are positioned on a bottom side of the head unit 45 adjacent the agricultural field and are coupled (e.g., selectively fastened) to the drive linkage 95 for movement therewith. The crop cutting assembly 75 also includes a fixed support 105 (e.g., a cross sub frame) that supports the cutting knives 100 during reciprocating movement of the cutting knives 100. In particular, the fixed support 105 includes protrusions 110 extending in a forward direction (relative to travel of the harvester 10) with some of the protrusions 110a having a slot 115 sized to receive a cutting knife 100 and configured such that a portion of each of those protrusions 110a is located above the cutting knives 100 and another portion of each of those protrusions 110a is located below the cutting knives 100. The protrusions 110a are also configured to extend forwardly beyond the cutting knives 100. In the illustrated embodiment, a distance 118 between adjacent protrusions 110a (i.e., a linear distance between tips of adjacent protrusions 110a parallel to the longitudinal axis 60, FIG. 2) can be between about 3 inches and about 4 inches. The illustrated protrusions 110b that do not include the slots 115 are positioned below the cutting knives 100 between adjacent protrusions 110a. The protrusions 110b are configured such that a portion of each knife of the cutting knives 100 extends forwardly beyond the protrusions 110b.

The fixed support 105 also includes hold down members 120 that engage a top surface of the cutting knives 100 to help guide the cutting knives 100 into the slots 115 and inhibit the cutting knives 100 from rotating upwardly away from the agricultural field as the cutting knives 100 reciprocate. In some embodiments, the hold down members 120 can always engage the cutting knives 100 or can be spaced slightly above the cutting knives 100 to selectively engage the cutting knives 100 if the cutting knives 100 begin to move out of alignment with the slots 115. In other embodiments, the protrusions 110 can be omitted and replaced with another series of cutting knives 100 so that at least one reciprocating mechanism 85 can move two separate series of cutting knives 100 relative to each other.

Figure 4:
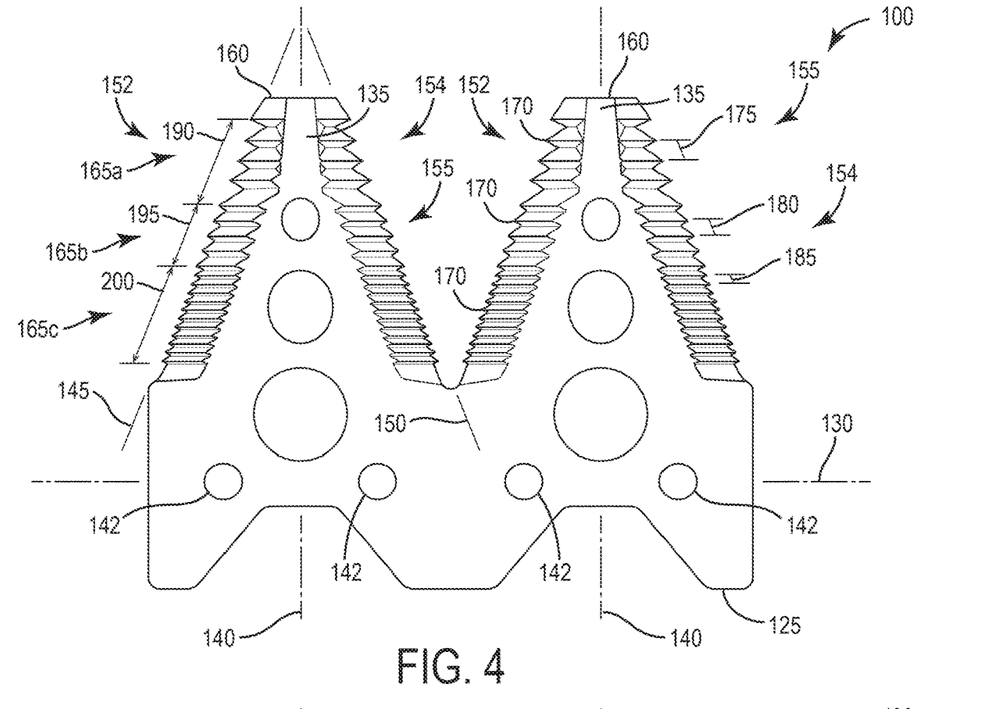
FIG. 4 is a top view of one embodiment of the plurality of cutting knives of FIG. 3.

With reference to FIG. 4, each cutting knife 100 includes a base 125 having a first central axis 130 oriented substantially parallel to the longitudinal axis 60 of the head unit 45 when the knives 100 are assembled thereto and two blades 135 extending away from the base 125 in the forward direction to each include a second central axis 140 substantially transverse to the first axis 130.

The illustrated base 125 includes a plurality of fastening apertures 142 each sized to receive a fastener (e.g., a bolt, etc.) to couple the cutting knife 100 to the drive linkage 95. In the illustrated embodiment, the first central axis 130 extends centrally through the fastening apertures 142. Each illustrated blade 135 includes a first obliquely angled edge 145 and a second obliquely angled edge 150 (relative to the first central axis 130 and the second central axis 140) such that each blade 135 is generally triangular in shape. In the illustrated embodiment, the edges 145, 150 are positioned on opposing sides 152, 154 of the blade 135 and are oriented greater than 45 degrees relative to the first central axis 130 (e.g., between about 50 degrees and about 70 degrees) and are oriented less than 45 degrees relative to the second central axis 140 (e.g., between about 40 degrees and about 20 degrees). The second central axis 140 of the blades 135 is oriented substantially parallel to a central axis of the protrusions 110. Cutting teeth 155 are positioned along each edge 145, 150 between an end 160 of each blade 135 and the base 125. In particular, each edge 145, 150 is a linear edge tangent to all of the tips 170 of the cutting teeth 155 on a particular side 152, 154 of the blade 135. In some embodiments, all of the tips 170 may not align tangent to a corresponding edge 145, 150 such that each edge 145, 150 is tangent to at least two tips 170 of the cutting teeth 155 (e.g., a linear line between one tip 170 closer to the end 160 and one tip 170 closer to the base 125) due to, for example, manufacturing tolerances of forming/shaping the cutting teeth 155. As shown in FIG. 4, each edge 145, 150 includes three distinct groupings of teeth 165a, 165b, 165c with each grouping 165a, 165b, 165c having a unique pitch. The pitch of the cutting teeth 155 is defined by a linear distance (parallel to the corresponding edge 145, 150) separating the tips 170 of adjacent cutting teeth 155. For example, as the pitch between adjacent cutting teeth 155 increases, the teeth per inch (TPI) of the cutting teeth 155 decreases. Conversely, as the pitch between adjacent cutting teeth 155 decreases, the TPI of the cutting teeth 155 increases. The illustrated first grouping of teeth 165a is positioned closer to the end 160 of each blade 135 than the other two groupings 165b, 165c, the second grouping of teeth 165b is positioned between the first and third groupings of teeth 165a, 165c, and the third grouping of teeth 165c is positioned closer to the base 125 than the other two groupings 165a, 165b. In other embodiments, the groupings of teeth 165a, 165b, 165c can be arranged differently along each edge 145, 150 (e.g., the third grouping 165c can be positioned the closest to the end 160, the second grouping 165b can be positioned the closest to the end 160, any of the groupings 165a, 165b, 165c can be positioned between the other two groupings 165a, 165b, 165c, etc.), and/or the blade 135 can include more than three groupings of teeth to have more than three groupings of different pitches.

The illustrated first grouping of teeth 165a includes at least three teeth having a first pitch 175 measured parallel to a corresponding edge 145, 150, the illustrated second grouping of teeth 165b includes at least three teeth having a second pitch 180 different than the first pitch 175 measured parallel to a corresponding edge 145, 150, and the third grouping of teeth 165c includes at least three teeth having a third pitch 185 different than at least one of the first or second pitches 175, 180 measured parallel to a corresponding edge 145, 150. In the illustrated embodiment, the first pitch 175 is greater than the second pitch 180, and the second pitch 180 is greater than the third pitch 185. For example, the first pitch 175 is about 7 TPI, the second pitch 180 is about 10 TPI, and the third pitch 185 is about 14 TPI. In other embodiments, the first pitch 175 can be less than or equal to about 8.5 TPI, the second pitch 180 can be greater than or equal to about 8.5 TPI but less than or equal to about 12 TPI, and the third pitch 185 can be greater than or equal to about 12 TPI. In other embodiments, the first grouping of teeth 165a can include more than or fewer than three teeth having the first pitch 175, the second grouping of teeth 165b can include more than or fewer than three teeth having the second pitch 180, and/or the third grouping of teeth 165c can include more than or fewer than three teeth having the third pitch 185.

In addition, the first grouping of teeth 165a includes a first linear length 190 (along each edge 145, 150 from outboard-most tips 170 of the first grouping 165a), the second grouping of teeth 165b includes a second linear length 195 (along each edge 145, 150 from outboard-most tips 170 of the second grouping 165b), and the third grouping of teeth 165c includes a third linear length 200 (along each edge 145, 150 from outboard-most tips 170 of the third grouping 165c). In the illustrated embodiment, the third linear length 200 is greater than the first and second linear lengths 190, 195, and the first linear length 190 is greater than the second linear length 195. For example, the first linear length 190 is between about 30% and about 40% of the total length of each edge 145, 150, the second linear length 195 is between about 15% and about 25% of the total length of each edge 145, 150, and the third linear length 200 is between about 35% and about 45% of the total length of each edge 145, 150. In other embodiments, the first linear length 190 is less than 40% of the total length of each edge 145, 150, the second linear length 195 is less than 30% of the total length of each edge 145, 150, and the third linear length 200 is greater than 30% of the total length of each edge 145, 150.

In the illustrated embodiment, the two blades 135 include similar cutting teeth 155, but in other embodiments, the two blades 135 can include dissimilar cutting teeth 155 (e.g., different groupings and arrangements of the cutting teeth, different pitches, different linear lengths, etc.).

As the harvester 10 moves through the agricultural field, stems or stalks of each crop plant are received between adjacent protrusions 110 of the crop cutting assembly 75 so that as the reciprocating mechanism 85 moves the cutting knives 100 back and forth, the cutting knives 100 pinch the stalks of the crop plants against one protrusion 110 to shear the stalks from the crop portions of the crop plants. In the illustrated embodiment, the reciprocating mechanism 85 is configured to move the cutting knives 100 along a cutting length that is generally the same as the distance 118 of the protrusions 110a. For example, the reciprocating mechanism 85 moves each cutting knife 100 between about 3 inches and about 4 inches in both reciprocating directions. As such, some of the cutting knives 100 move from one slot 115 of a first protrusion 110a, past a protrusion 110b, to another slot 115 of an adjacent protrusion 110a to shear the stalks from the crop portions of the crop plants. In addition, other cutting knives 100 move from a first protrusion 110b, through a slot 115, to an adjacent protrusion 110b to shear the stalks from the crop portions of the crop plants. In other embodiments, the cutting length of the cutting knives 100 can be different than the distance 118. Once the crop portions are sheared from the stalks, the crop portions proceed to the conveyor 50 via the reel 65 and then are conveyed to the threshing unit 40, as discussed above.

The illustrated cutting knives 100 with a variable pitch as disclosed function to efficiently cut different sized crop plants and thereby avoid continual replacement with specific cutting knives to cut specific crop plants, which can be time consuming. In general, the third smaller pitch 185 of the third grouping of cutting teeth 165c is efficient in cutting smaller sized/rigidity crop plants (e.g., wheat, barley, rice, oats, etc.) but less efficient in cutting larger sized/rigidity crop plants (e.g., corn, etc.), the first larger pitch 175 of the first grouping of cutting teeth 165a is efficient in cutting larger sized crop plants but less efficient in cutting smaller sized crop plants, and the second pitch 180 of the second grouping of cutting teeth 165b is efficient in cutting medium sized/rigidity crop plants (e.g., soybeans, canola, oilseed rape, etc.). Also, the smaller sized crop plants are typically planted closer together (e.g., a higher population) than the medium sized crop plants and the larger sized crop plants, which include a lower population. By including the first, second, and third groupings of cutting teeth 165a, 165b, 165c on each edge 145, 150 of the blade 135, the illustrated cutting knives 100 can efficiently cut a wide range of different types of crop plants.

For example, when the harvester 10 is harvesting wheat (a relatively smaller sized/rigidity crop plant), the wheat stalks generally move into alignment with the third grouping of cutting teeth 165c to be pinched against the protrusions 110 thereby for the wheat stalks to be sheared from the crop portions of the wheat. In other embodiments, the second and first groupings of cutting teeth 165b, 165a can also shear the wheat stalks, although less efficiently than the third grouping of cutting teeth 165c. When the harvester 10 is harvesting beans (a relatively medium sized/rigidity crop plant), the cutting knives 100 are configured for the bean stalks to generally move into alignment with the second grouping of cutting teeth 165b to be pinched against the protrusions 100 thereby for the bean stalks to be sheared from the crop portions of the beans. In other words, the size of the bean stalks is generally too large to align with the third grouping of cutting teeth 165c for the third grouping of cutting teeth 165c to cut the bean stalks. In other embodiments, a portion of the bean stalks is initially cut by the third grouping of cutting teeth 165c before the second grouping of cutting teeth 165b shears the bean stalks. In further embodiments, the first grouping of cutting teeth 165a can also shear the bean stalks, although less efficiently than the second grouping of cutting teeth 165b. When the harvester 10 is harvesting a crop plant (e.g., wheat) with a left over crop plant (e.g., corn or cotton) from a previous harvest dispersed throughout the agricultural field (corn/cotton being a relatively large sized/rigidity crop plant), the cutting knives 100 are configured for the corn/'cotton stalks to generally move into alignment with the first grouping of cutting teeth 165a to be pinched against the protrusions 100 thereby for the corn/cotton stalks to be sheared adjacent the agricultural field. In other words, the size of the corn/cotton stalks is generally too large to align with the second and third groupings of cutting teeth 165b, 165c to be cut by the second and the third groupings of cutting teeth 165b, 165c. In other embodiments, a portion of the corn/cotton stalks is initially cut by the second grouping of cutting teeth 165b before the first grouping of cutting teeth 165a shears the corn/cotton stalks.

Figure 5:
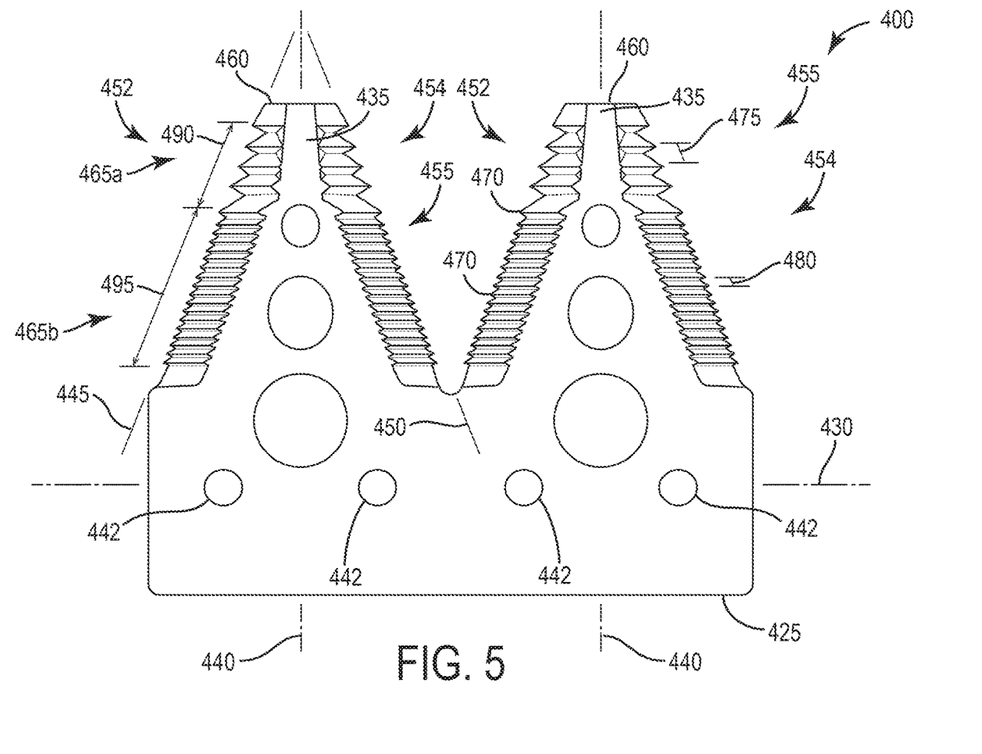
FIG. 5 is a top view of another embodiment of the plurality of cutting knives of FIG. 3.

FIG. 5 illustrates a cutting knife 400 according to another embodiment. The cutting knife 400 is similar to the cutting knife 100; therefore, similar components are designated with similar references numbers plus 300. At least some differences and/or at least some similarities between the cutting knives 100, 400 will be discussed in detail below. In addition, the features described with respect to the cutting knife 100 are equally applicable to features described with respect to the cutting knife 400.

The illustrated cutting knife 400 includes a base 425 having fastening apertures 442 and a first central axis 430. The cutting knife 400 also includes two blades 435 each having a second central axis 440. Each blade 435 includes a first obliquely angled edge 445 positioned on a first side 452 of the blade 435 and a second obliquely angled edge 450 positioned on a second side 454 of the blade 435 with cutting teeth 455 positioned along each edge 445, 450 between an end 460 of each blade 435 and the base 425. The cutting teeth 455 include two distinct groupings of teeth 465a, 465b with the first grouping 465a having a first pitch 475 between adjacent tips 470 and the second grouping 465b having a second pitch 480 between adjacent tips 470. The second pitch 480 is smaller than the first pitch 475. For example, the first pitch 475 is about 7 TPI, and the second pitch 480 is about 14 TPI. In other embodiments, the first pitch 475 can be less than or equal to about 10 TPI, and the second pitch 480 can be greater than or equal to about 10 TPI. In further embodiments, the first and second pitches 475, 480 can be between about 7 TPI and about 15 TPI. In addition, the first grouping of teeth 465a includes a first linear length 490 measured parallel to a corresponding edge 145, 150, and the second grouping of teeth 465b includes a second linear length 495 measured parallel to a corresponding edge 145, 150. In the illustrated embodiment, the second linear length 495 is greater than the first linear length 490. For example, the first linear length 490 is between about 30% and about 40% of the total length of each edge 445, 450, and the second linear length 495 is between about 60% and about 70% of the total length of each edge 445, 450. In another embodiment, the first linear length 490 is less than 45% of the total length of each edge 445, 450, and the second linear length 495 is greater than 45% of the total length of each edge 445, 450.

As the harvester 10 moves through the agricultural field to harvest relatively smaller sized crop plants (e.g., wheat), the adjacent pairs of second teeth 465b efficiently cut the wheat stalks. Conversely, as the harvester 10 moves through the agricultural field to harvest relatively larger sized crop plants (e.g., corn), the adjacent pairs of first teeth 465a efficiently cut the corn stalks. However, as the harvester 10 moves through the agricultural field to harvest relatively medium sized crop plants (e.g., beans), a combination of the first and second teeth 465a, 465b efficiently cut the bean stalks. In other embodiments, the first teeth 465a can help cut the wheat stalks, and the second teeth 465b can help cut the corn stalks.

Figure 6:
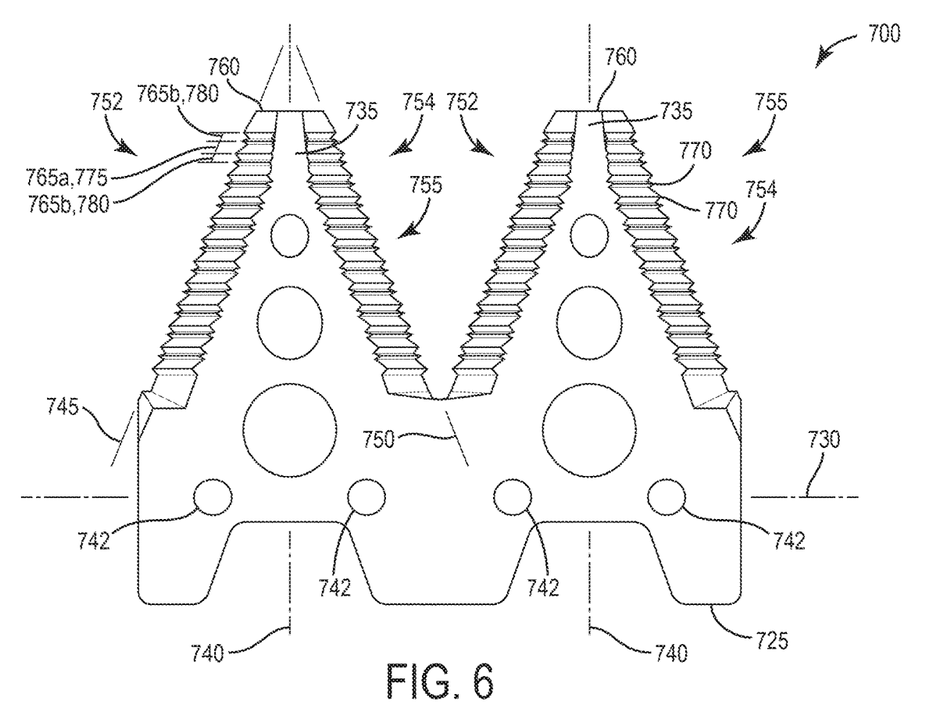
FIG. 6 is a top view of another set of the plurality of cutting knives of FIG. 3.

FIG. 6 illustrates a cutting knife 700 according to another embodiment. The cutting knife 700 is similar to the cutting knife 100; therefore, similar components are designated with similar references numbers plus 600. At least some differences and/or at least some similarities between the cutting knives 100, 700 will be discussed in detail below. In addition, the features described with respect to the cutting knife 100 and/or the cutting knife 400 are equally applicable to features described with respect to the cutting knife 700.

The illustrated cutting knife 700 includes a base 725 having fastening apertures 742 and a first central axis 730. The cutting knife 700 also includes two blades 735 each having a second central axis 740. Each blade 735 includes a first obliquely angled edge 745 positioned on a first side 752 of the blade 735 and a second obliquely angled edge 750 positioned on a second side 754 of the blade 735 with cutting teeth 755 positioned along each edge 750, 755 between an end 760 of each blade 735 and the base 725. An adjacent pair of first teeth 765a includes a first pitch 775 and an adjacent pair of second teeth 765b includes a second pitch 780 different than the first pitch 775. The first pitch 775 is greater than the second pitch 780. The first teeth 765a and the second teeth 765b share a tip 770 of a cutting tooth 755. As such, consecutive adjacent cutting teeth 755 reciprocate between the first pitch 775 and the second pitch 780 such that a series of four adjacent cutting teeth 755 includes the second pitch 780 twice and the first pitch 775 once (e.g., starting with the second pitch 780 adjacent the end 760 and extending toward the base 725).

As the harvester 10 moves through the agricultural field to harvest relatively smaller sized crop plants (e.g., wheat), the adjacent pairs of second teeth 765b efficiently cut the wheat stalks. Conversely, as the harvester 10 moves through the agricultural field to harvest relatively larger sized crop plants (e.g., corn), the adjacent pairs of first teeth 765a efficiently cut the corn stalks. However, as the harvester 10 moves through the agricultural field to harvest relatively medium sized crop plants (e.g., beans), a combination of the first and second teeth 765a, 765b efficiently cut the bean stalks. In other embodiments, the first teeth 765a can help cut the wheat stalks, and the second teeth 765b can help cut the corn stalks.

Figure 7:
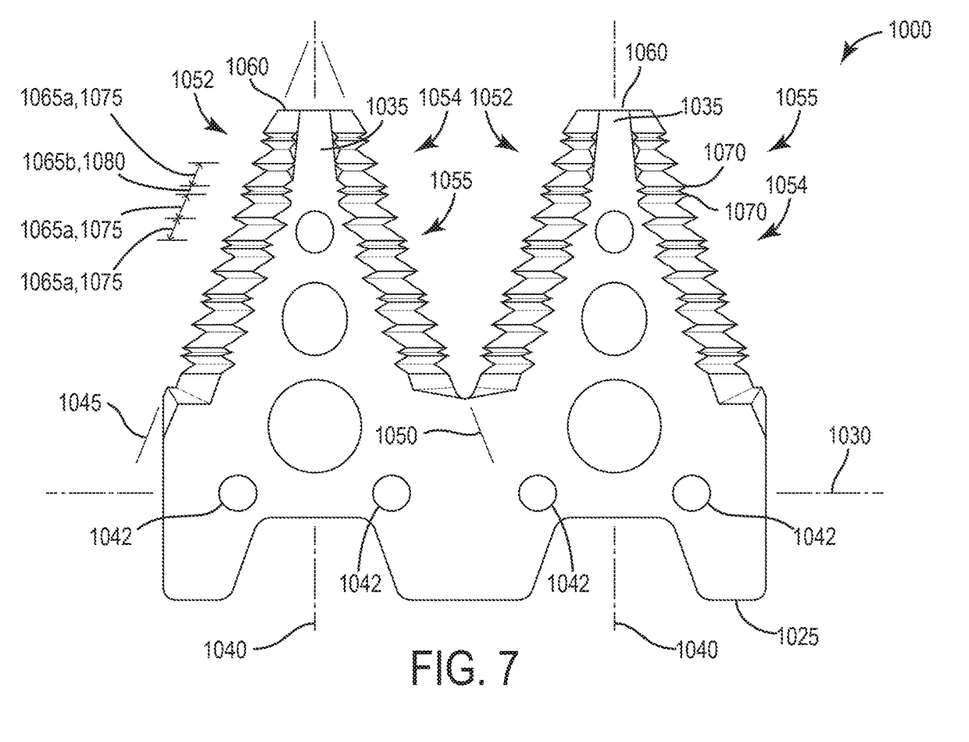
FIG. 7 is a top view of another set of the plurality of cutting knives of FIG. 3.

FIG. 7 illustrates a cutting knife 1000 according to another embodiment. The cutting knife 1000 is similar to the cutting knife 100; therefore, similar components are designated with similar references numbers plus 900. At least some differences and/or at least some similarities between the cutting knives 100, 1000 will be discussed in detail below. In addition, the features described with respect to the cutting knife 100, the cutting knife 400, and/or the cutting knife 700 are equally applicable to features described with respect to the cutting knife 1000.

The illustrated cutting knife 1000 includes a base 1025 having fastening apertures 1042 and a first central axis 1030. The cutting knife 1000 also includes two blades 1035 each having a second central axis 1040. Each blade 1035 includes a first obliquely angled edge 1045 positioned on a first side 1052 of the blade 1035 and a second obliquely angled edge 1050 positioned on a second side 1054 of the blade 1035 with cutting teeth 1055 positioned along each edge 1045, 1050 between an end 1060 of each blade 1035 and the base 1025. An adjacent pair of first teeth 1065a includes a first pitch 1075 and an adjacent pair of second teeth 1065b includes a second pitch 1080 different than the first pitch 1075. The first pitch 1075 is greater than the second pitch 1080. The first teeth 1065a and the second teeth 1065b share a tip 1070 of a cutting tooth 1055. As such, consecutive adjacent cutting teeth 1055 reciprocate between the first pitch 1075 and the second pitch 1080 such that a series of four adjacent cutting teeth 1055 include the first pitch 1075 twice and the second pitch 1080 once (e.g., starting with the first pitch 1075 adjacent the end 1060 and extending toward the base 1025). The cutting knife 1000 also includes a series of five adjacent cutting teeth 1055 that include the first pitch 1075 three times and the second pitch 1080 once.

As the harvester 10 moves through the agricultural field to harvest relatively smaller sized crop plants (e.g., wheat), the adjacent pairs of second teeth 1065b efficiently cut the wheat stalks. Conversely, as the harvester 10 moves through the agricultural field to harvest relatively larger sized crop plants (e.g., corn), the adjacent pairs of first teeth 1065a efficiently cut the corn stalks. However, as the harvester 10 moves through the agricultural field to harvest relatively medium sized crop plants (e.g., beans), a combination of the first and second teeth 1065a, 1065b efficiently cut the bean stalks. In other embodiments, the first teeth 1065a can help cut the wheat stalks, and the second teeth 1065b can help cut the corn stalks.

In the illustrated embodiments within FIGS. 4-7, the base 125, 425, 725, 1025 includes a width (along the first central axis 130, 430, 730, 1030) that accommodates two blades 135, 435, 735, 1035 such that the cutting knife 100, 400, 700, 1000 can be easily replaced on the head unit 45 (e.g., the cutting knife 100, 400, 700, 1000 is not too wide as to decease the serviceability of the cutting knife 100, 400, 700, 1000) while keeping the cost of manufacturing the cutting knife 100, 400, 700, 1000 relatively low. In other embodiments, each cutting knife 100, 400, 700, 1000 can include one of the blades 135, 435, 735, 1035, or each cutting knife 100, 400, 700, 1000 can include more than two blades 135, 435, 735, 1035. In further embodiments, at least one of the blades 135, 435, 735, 1035 can be sized differently (e.g., a smaller triangular shaped blade) than the other blade 135, 435, 735, 735, 1035 on the same base 125, 425, 725, 1025.

Although the disclosure has been described in detail with reference to certain preferred embodiments, variations and modifications exist within the scope and spirit of one or more independent aspects of the disclosure as described. Various features and advantages of the disclosure are set forth in the following claims.

What is claimed is:

1. A cutting knife configured to be coupled to an agricultural combine harvester to cut crop plants from an agricultural field, the cutting knife comprising:
a base configured to be coupled to a head unit of the agricultural combine harvester; and
a blade including a blade central axis extending away from the base, the blade including a plurality of cutting teeth, each tooth of the plurality of teeth having a tip, the blade including an edge tangent to each tip on a first side of the blade, the edge obliquely oriented relative to the blade central axis, the plurality of cutting teeth including a first tooth, a second tooth consecutive with the first tooth, a third tooth consecutive with the second tooth, a fourth tooth consecutive with the third tooth, and a fifth tooth consecutive with the fourth tooth, the consecutive first, second, third, fourth, and fifth teeth positioned along the edge,
wherein a first distance separates the tips of a first adjacent pair of the consecutive first, second, third, fourth, and fifth teeth,
wherein a second distance less than the first distance separates the tips of a second adjacent pair of the consecutive first, second, third, fourth, and fifth teeth,
wherein a third distance substantially the same as the first distance separates the tips of a third adjacent pair of the consecutive first, second, third, fourth, and fifth teeth, and
wherein a fourth distance substantially the same as the second distance separates the tips of a fourth adjacent pair of the consecutive first, second, third, fourth, and fifth teeth.

2. The cutting knife of claim 1, wherein the edge is a first edge, and wherein the blade includes a second edge opposite the first edge with a plurality of cutting teeth each having a tip positioned along the second edge, and wherein the second edge is tangent to each tip of the plurality of teeth on a second side of the blade, and wherein the second edge is obliquely oriented relative to the blade central axis.

3. The cutting knife of claim 2, wherein the blade is a first blade including a first blade central axis, and wherein the cutting knife includes a second blade including a second blade central axis extending away from the base, and wherein the base includes a base central axis oriented substantially transverse to the first and second blade central axes.

4. The cutting knife of claim 3, wherein the second blade includes a third edge opposite a fourth edge with a plurality of cutting teeth each having a tip positioned along the third and fourth edges, and wherein the third edge is tangent to each tip of the plurality of cutting teeth on a third side of the second blade, and the fourth edge is tangent to each tip of the plurality of cutting teeth on a fourth side of the second blade, and wherein the third and fourth edges are obliquely oriented relative to the second central blade axis.

5. The cutting knife of claim 2, wherein the plurality of cutting teeth includes consecutive sixth, seventh, eighth, ninth, and tenth teeth positioned along the second edge of the blade.

6. The cutting knife of claim 5, wherein the first distance separates the tips of a first adjacent pair of the consecutive sixth, seventh, eighth, ninth, and tenth teeth, the second distance separates the tips of a second adjacent pair of the consecutive sixth, seventh, eighth, ninth, and tenth teeth, the third distance separates the tips of a third adjacent pair of the consecutive sixth, seventh, eighth, ninth, and tenth teeth, and the fourth distance separates the tips of a fourth adjacent pair of the consecutive sixth, seventh, eighth, ninth, and tenth teeth.

7. The cutting knife of claim 6, wherein the first, second, third, fourth, and fifth teeth are symmetric with the sixth, seventh, eighth, ninth, and tenth teeth along the blade central axis.

8. A cutting knife configured to be coupled to an agricultural combine harvester to cut crop plants from an agricultural field, the cutting knife comprising:
a base configured to be coupled to a head unit of the agricultural combine harvester; and
a blade including a blade central axis extending away from the base, the blade including a plurality of cutting teeth, each tooth of the plurality of teeth having a tip, the blade including an edge tangent to each tip on a first side of the blade, the edge obliquely oriented relative to the blade central axis, the plurality of cutting teeth including a first tooth, a second tooth, a third tooth, a fourth tooth, and a fifth tooth positioned along the edge,
wherein a first distance separates the tips of the first and second teeth, a second distance different than the first distance separates the tips of the second and third teeth, a third distance substantially the same as the first distance separates the tips of the third and fourth teeth, and a fourth distance substantially the same as the second distance separates the tips of the fourth and fifth teeth.

9. The cutting knife of claim 8, wherein the edge is a first edge, and wherein the blade includes a second edge opposite the first edge with a plurality of cutting teeth each having a tip positioned along the second edge, and wherein the second edge is tangent to each tip of the plurality of teeth on a second side of the blade, and wherein the second edge is obliquely oriented relative to the blade central axis.

10. The cutting knife of claim 9, wherein the blade is a first blade including a first blade central axis, and wherein the cutting knife includes a second blade including a second blade central axis extending away from the base, and wherein the base includes a base central axis oriented substantially transverse to the first and second blade central axes.

11. The cutting knife of claim 10, wherein the second blade includes a third edge opposite a fourth edge with a plurality of cutting teeth each having a tip positioned along the third and fourth edges, and wherein the third edge is tangent to each tip of the plurality of cutting teeth on a third side of the second blade, and the fourth edge is tangent to each tip of the plurality of cutting teeth on a fourth side of the second blade, and wherein the third and fourth edges are obliquely oriented relative to the second central blade axis.

12. The cutting knife of claim 9, wherein the plurality of cutting teeth includes sixth, seventh, eighth, ninth, and tenth teeth positioned along the second edge of the blade.

13. The cutting knife of claim 12, wherein the first distance separates the tips of the sixth and seventh teeth, the second distance separates the tips of the seventh and eighth teeth, the third distance separates the tips of the eighth and ninth teeth, and the fourth distance separates the tips of the ninth and tenth teeth.

14. The cutting knife of claim 13, wherein the first, second, third, fourth, and fifth teeth are symmetric with the sixth, seventh, eighth, ninth, and tenth teeth along the blade central axis.

15. A cutting knife configured to be coupled to an agricultural combine harvester to cut crop plants from an agricultural field, the cutting knife comprising:
a base configured to be coupled to a head unit of the agricultural combine harvester; and
a blade including a blade central axis extending away from the base, the blade including a plurality of cutting teeth, each tooth of the plurality of teeth having a tip, the blade including a first edge tangent to each tip on a first side of the blade and a second edge tangent to each tip on a second side of the blade, the first and second edges obliquely oriented relative to the blade central axis, the plurality of cutting teeth including consecutive first, second, and third teeth positioned along the first edge and consecutive fourth, fifth, and sixth teeth positioned along the second edge,
wherein a first distance separates the tips of the first and second teeth, a second distance different than the first distance separates the tips of the second and third teeth, a third distance substantially the same as the first distance separates the tips of the fourth and fifth teeth, and a fourth distance substantially the same as the second distance separates the tips of the fifth and sixth teeth, and
wherein the first, second, and third teeth are symmetric with the fourth, fifth, and sixth teeth along the blade central axis.

16. The cutting knife of claim 15, wherein the first, second, and third teeth are consecutive cutting teeth, and wherein the fourth, fifth, and sixth teeth are consecutive cutting teeth.

17. The cutting knife of claim 16, wherein the plurality of cutting teeth includes consecutive seventh and eighth teeth positioned on the first edge of the blade consecutive with the third tooth, and wherein the plurality of cutting teeth includes consecutive ninth and tenth teeth positioned on the second edge of the blade consecutive with the sixth tooth.

18. The cutting knife of claim 17, wherein a fifth distance substantially the same as the first distance separates the tips of the third and seventh teeth, a sixth distance substantially the same as the second distance separates the tips of the seventh and eighth teeth, a seventh distance substantially the same as the third distance separates the tips of the sixth and ninth teeth, and an eighth distance substantially the same as the fourth distance separates the tips of the ninth and tenth teeth.

19. The cutting knife of claim 15, wherein the blade is a first blade including a first blade central axis, and wherein the cutting knife includes a second blade including a second blade central axis extending away from the base, and wherein the base includes a base central axis oriented substantially transverse to the first and second blade central axes.

20. The cutting knife of claim 19, wherein the second blade includes a third edge opposite a fourth edge with a plurality of cutting teeth each having a tip positioned along the third and fourth edges, and wherein the third edge is tangent to each tip of the plurality of cutting teeth on a third side of the second blade, and the fourth edge is tangent to each tip of the plurality of cutting teeth on a fourth side of the second blade, and wherein the third and fourth edges are obliquely oriented relative to the second central blade axis.

* * * * *